US008015630B2

(12) United States Patent
Kihs

(10) Patent No.: US 8,015,630 B2
(45) Date of Patent: Sep. 13, 2011

(54) VALVE MECHANISM FOR CONTROLLING RELEASE OF PRESSURIZED FLUID

(76) Inventor: Josef K. Kihs, Stoney Creek (CA)

( * ) Notice: Subject to any disclaimer, the term of this patent is extended or adjusted under 35 U.S.C. 154(b) by 0 days.

(21) Appl. No.: 12/710,288

(22) Filed: Feb. 22, 2010

(65) Prior Publication Data

US 2010/0212076 A1    Aug. 26, 2010

Related U.S. Application Data

(60) Provisional application No. 61/154,713, filed on Feb. 23, 2009, provisional application No. 61/294,099, filed on Jan. 11, 2010.

(51) Int. Cl.
*E03D 9/00* (2006.01)
(52) U.S. Cl. .................................. 4/255.06
(58) Field of Classification Search .... 4/255.04–255.09, 4/255.01; 251/149.6, 149.1; 15/405–407; 222/88, 5, 402.24, 402.13; 141/19; 215/307
See application file for complete search history.

(56) References Cited

U.S. PATENT DOCUMENTS

| 2,016,113 | A | * | 10/1935 | Lambert et al. | 222/5 |
|---|---|---|---|---|---|
| 2,021,603 | A | * | 11/1935 | Kelley, Jr. et al. | 222/5 |
| 2,300,319 | A | * | 10/1942 | Smith | 4/255.01 |
| 2,939,154 | A | * | 6/1960 | Gasser | 4/255.01 |
| 3,189,934 | A | * | 6/1965 | Steinwedel | 15/406 |
| 3,280,419 | A | * | 10/1966 | Frohlich | 15/406 |
| 4,047,253 | A | * | 9/1977 | Petterson | 4/255.01 |
| 5,249,311 | A | * | 10/1993 | Rau | 4/255.05 |
| 5,400,920 | A | * | 3/1995 | Barnhart | 222/1 |
| 5,666,690 | A | * | 9/1997 | Domansky | 15/406 |
| 5,803,101 | A | * | 9/1998 | Gallo | 134/166 C |
| 6,161,735 | A | * | 12/2000 | Uchiyama et al. | 222/402.13 |
| 6,877,625 | B2 | * | 4/2005 | Alley | 215/307 |
| 6,922,854 | B2 | * | 8/2005 | Allenbaugh et al. | 4/255.11 |

OTHER PUBLICATIONS

Kleer Drain; "Super Powerful Compressed Air Cleans Clogged Drains Fast!"; <www.kleerdrain.com/store.aspx>; Last Visited on May 20, 2010.

* cited by examiner

*Primary Examiner* — Gregory L Huson
*Assistant Examiner* — Janie Christiansen
(74) *Attorney, Agent, or Firm* — Steven M. Greenberg; Carey, Rodriguez, Greenberg & O'Keefe, LLP

(57) ABSTRACT

A valve mechanism for controlling release of pressurized fluid includes a fluid chamber. A plunger is received in an aperture in the fluid chamber, and is movable between a fluid retention position in which fluid is substantially trapped in the fluid chamber and a fluid release position in which fluid can escape from the fluid chamber through passages in the plunger. The plunger is biased into the fluid retention position. A driver drives a plunger actuator, and the plunger actuator is guided into engagement with the plunger to cause the plunger and the plunger actuator to move in unison and move the plunger into the fluid release position during a first portion of a stroke of the driver towards the fluid chamber, and the plunger actuator is further guided to permit the plunger to return to the fluid retention position during a second portion of the stroke.

4 Claims, 9 Drawing Sheets

VALVE MECHANISM FOR CONTROLLING RELEASE OF PRESSURIZED FLUID

CROSS-REFERENCE TO RELATED APPLICATIONS

This application claims priority from U.S. Provisional Patent Application No. 61/154,713 filed on Feb. 23, 2009 and U.S. Provisional Patent Application No. 61/294,099 filed on Jan. 11, 2010, the teachings of each of which are hereby incorporated by reference in their entirety.

FIELD OF INVENTION

The present invention relates to valve mechanisms, and more particularly to valve mechanisms for metering discharge of a fluid.

BACKGROUND OF THE INVENTION

Clogged drains can present an annoying and potentially serious problem. Many different types of material can form or be incorporated into a drain clog, and different types of chemical drain cleaners are known. Some of these chemical drain cleaners are potentially hazardous.

The use of pressurized gas to clear clogged drains is also known. Typically, a user will place the outlet of a gas-based drain clearing device against the mouth of the drain to be cleared, and apply pressure to an actuator, which causes a valve to be opened so that the pressurized gas flows into the drain to remove the clog. Typically, the valve will stay open as long as pressure continues to be applied to the actuator, which can result in too much gas being released into the drain, potentially damaging it. One solution to this problem is to provide a single-use cartridge containing a measured amount of gas, but this approach requires the cartridge (or the device, where the cartridge is integral thereto) to be replaced each time the drain clearing device is used. This can be particularly inconvenient for stubborn drain clogs which require more than one burst of gas to be removed.

In addition to drain clearing devices, there are other applications in which metered release of a pressurized fluid is desirable.

SUMMARY OF THE INVENTION

In one aspect, the present invention is directed to a valve mechanism for controlling release of pressurized fluid. The valve mechanism comprises a housing and a fluid chamber defined within the housing, with the fluid chamber defining an interior volume and having a fluid chamber inlet and a plunger aperture. The valve mechanism further comprises a plunger having a closed end and a plunger outlet end. The plunger has at least one plunger fluid passage extending partially along a length of the plunger from the plunger outlet end, and has at least one plunger inlet defined in a longitudinal wall thereof in fluid communication with the at least one plunger fluid passage. The plunger is slidably received in the plunger aperture in sealing engagement therewith, with the closed end within the interior volume of the fluid chamber, so as to be movable between a fluid retention position in which the at least one plunger inlet is isolated from the interior volume of the fluid chamber and a fluid release position in which the at least one plunger inlet is in fluid communication with the interior volume of the fluid chamber. The valve mechanism further includes a plunger biasing member acting between the plunger and the housing to bias the plunger into the fluid retention position. The valve mechanism additionally comprises a driver having a driving end and a driver outlet end and having at least one driver fluid passage extending therethrough between the driving end and the driver outlet end. The driver is slidably received within the housing. The valve mechanism also comprises a plunger actuator having a plunger actuator inlet end and a plunger actuator outlet end, and at least one plunger actuator fluid passage extending therethrough between the plunger actuator inlet end and the plunger actuator outlet end. The plunger actuator is received within the housing between the plunger and the driver. The valve mechanism includes a guide mechanism for guiding the plunger actuator into engagement with the plunger to cause the plunger and the plunger actuator to move in unison and move the plunger into the fluid release position during a first portion of a stroke of the driver towards the fluid chamber when the valve mechanism is oriented with the plunger actuator above the driver, and further guiding the plunger actuator to permit the plunger to return to the fluid retention position under urging from the plunger biasing member during a second portion of the stroke of the driver towards the fluid chamber when the valve mechanism is oriented with the plunger actuator above the driver. At least when the plunger is in the fluid release position, the at least one plunger fluid passage is in fluid communication with the at least one plunger actuator fluid passage and the at least one plunger actuator fluid passage is in fluid communication with the at least one driver fluid passage.

In an embodiment, following completion of the stroke of the driver towards the fluid chamber and release of external force acting on the driver, the plunger actuator and the driver return to their respective pre-stroke positions when the valve mechanism is oriented with the plunger actuator above the driver. In a particular embodiment, the plunger actuator and the driver return to their respective pre-stroke positions under gravity when the valve mechanism is oriented with the plunger actuator above the driver.

In an embodiment, the at least one plunger fluid passage comprises a single plunger fluid passage and the plunger actuator inlet end is sized to fit within the single plunger fluid passage, and the plunger has a peripheral rim surrounding the single plunger fluid passage at the plunger outlet end. The plunger actuator inlet end of the plunger actuator engages the peripheral rim at the plunger outlet end during the first portion of the stroke of the driver towards the fluid chamber when the valve mechanism is oriented with the plunger actuator above the driver, and the plunger actuator inlet end moves into registration with the single plunger fluid passage so that the plunger actuator inlet end is received within the single plunger fluid passage to permit sliding movement of the plunger toward the plunger actuator during the second portion of the stroke of the driver towards the fluid chamber when the valve mechanism is oriented with the plunger actuator above the driver. In a particular embodiment, the guide mechanism comprises the driving end of the driver having a driver engagement face and the plunger actuator outlet end having a plunger actuator engagement face, with at least one of the driver engagement face and the plunger actuator engagement face being shaped to direct the plunger actuator inlet end of the plunger actuator to engage the peripheral rim at the plunger outlet end during the first portion of the stroke of the driver towards the fluid chamber when the valve mechanism is oriented with the plunger actuator above the driver.

In a more particular embodiment, the guide mechanism further comprises a guide channel defined in the housing, the guide channel being so positioned within the housing and having a surface shaped to guide the plunger actuator inlet end into registration with the single plunger fluid passage during the second portion of the stroke of the driver towards the fluid chamber when the valve mechanism is oriented with the plunger actuator above the driver. In such an embodiment, the plunger actuator inlet end may be narrower than the plunger actuator outlet end and the guide channel may have a narrow end adjacent the plunger and a wide end adjacent the driver and taper between the wide end and the narrow end.

In one aspect, the present invention is directed to a drain clearing device comprising a valve mechanism as described above and a fluid reservoir having a sufficient quantity of sufficiently pressurized gas disposed therein, with the fluid reservoir being in fluid communication with the fluid chamber inlet. In one embodiment of such a drain clearing device, the fluid reservoir consists of a separate cartridge secured within a cartridge cavity in a main body of the drain clearing device. A drain clearing device according to an aspect of the present invention may include an external actuator movably secured to the housing and mechanically coupled to the driver to cause sliding movement of the driver toward the fluid chamber when the external actuator moves towards the fluid chamber. In a particular embodiment, the external actuator may be an outlet fitting for sealingly engaging a drain, and the outlet fitting may be secured to an outlet end of the drain clearing device and have an outlet aperture in fluid communication with the driver fluid passage.

A drain clearing device as described above may further comprise a cartridge insertion aperture at one end of the main body, a cartridge piercer disposed at an opposite end of the cartridge cavity from the cartridge insertion aperture, and a cartridge cavity closure cap. The cartridge cavity closure cap is removably securable to the main body to obstruct the cartridge insertion aperture and push an outlet end of the fluid cartridge into engagement with the cartridge piercer and close the cartridge cavity. The cartridge cavity closure cap is constrained, during removal thereof from the main body, to move through an intermediate position in which the fluid cartridge is released from engagement with the cartridge piercer while the cartridge cavity closure cap remains secured to the main body and the cartridge cavity is vented to ambient. In a particular embodiment, the cartridge insertion aperture is defined by a hollow threaded shaft portion having at least one vent defined therein in fluid communication with the cartridge cavity, and the cartridge cavity closure cap is correspondingly threaded for threaded engagement with the threaded shaft portion. Removal of the cartridge cavity closure cap consists of unscrewing the cartridge cavity closure cap from the threaded shaft portion of the main body, and in the intermediate position the cartridge cavity closure cap has been unscrewed past the at least one vent to expose the at least one vent while the cartridge cavity closure cap remains threadedly secured to the main body.

In another aspect, the present invention is directed to a device for controlled release of pressurized fluid. The device comprises a main body defining a cartridge cavity and a cartridge insertion aperture at one end of the main body, a cartridge piercer disposed at an opposite end of the cartridge cavity from the cartridge insertion aperture, and an outlet. The device further comprises a valve mechanism in fluid communication with the outlet for selectively permitting gas from the cartridge to be expelled from the outlet. The valve mechanism includes an inlet connectable in fluid communication with a cartridge received in the cartridge cavity, and a cartridge cavity closure cap removably securable to the main body to obstruct the cartridge insertion aperture and push an outlet end of the fluid cartridge into engagement with the cartridge piercer and close the cartridge cavity. The cartridge cavity closure cap is constrained, during removal thereof from the main body, to move through an intermediate position in which the fluid cartridge is released from engagement with the cartridge piercer while the cartridge cavity closure cap remains secured to the main body and the cartridge cavity is vented to ambient. In a particular embodiment, the cartridge insertion aperture is defined by a hollow threaded shaft portion having at least one vent defined therein in fluid communication with the cartridge cavity, and the cartridge cavity closure cap is correspondingly threaded for threaded engagement with the threaded shaft portion. Removal of the cartridge cavity closure cap consists of unscrewing the cartridge cavity closure cap from the threaded shaft portion of the main body, and the intermediate position is a point at which the cartridge cavity closure cap has been unscrewed past the at least one vent to expose the at least one vent while the cartridge cavity closure cap remains threadedly secured to the main body. The device for controlled release of pressurized fluid may be a drain clearing device.

BRIEF DESCRIPTION OF THE DRAWINGS

These and other features of the invention will become more apparent from the following description in which reference is made to the appended drawings wherein.

DETAILED DESCRIPTION

Figure 1:
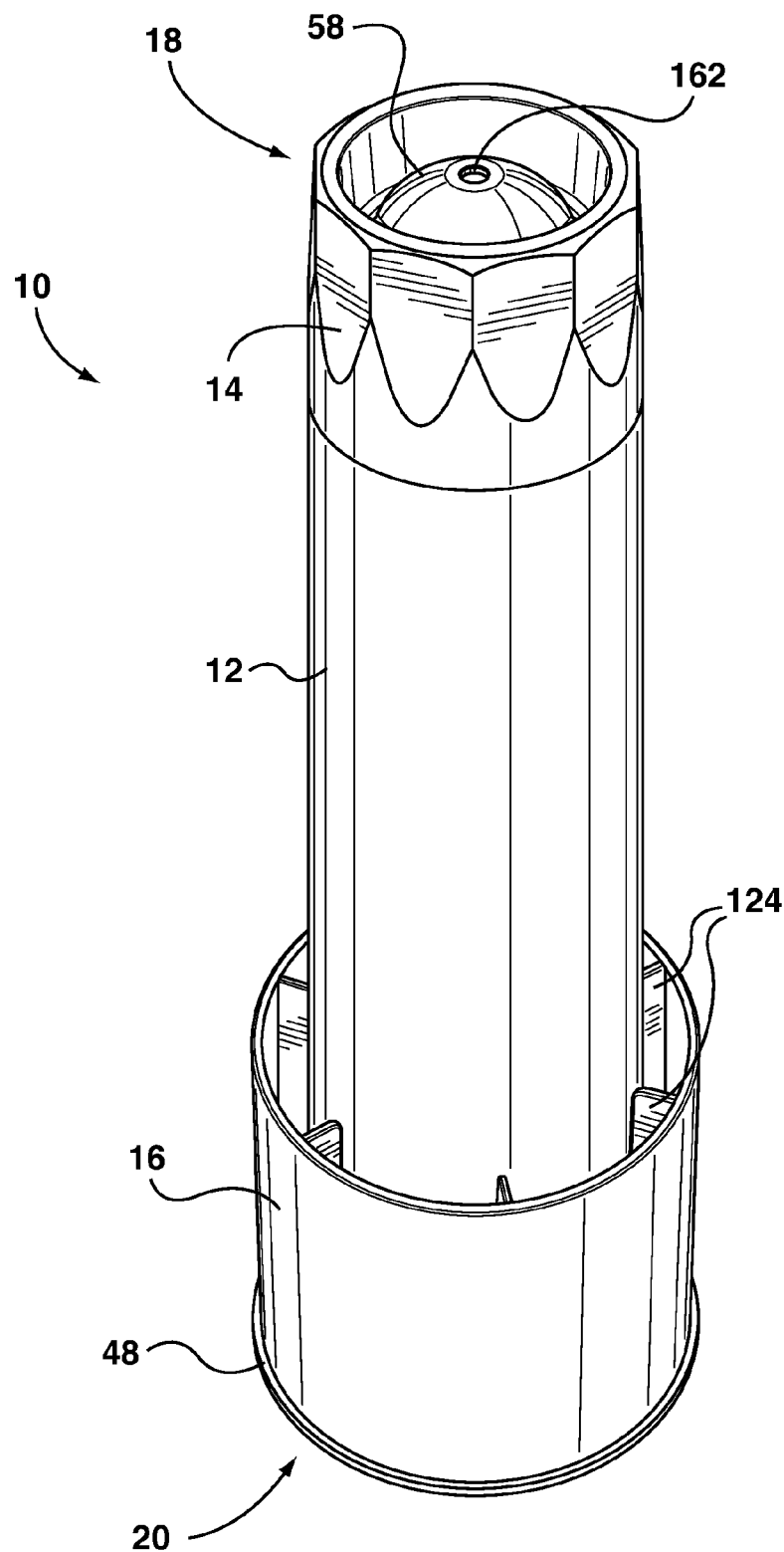
FIG. 1 is a perspective view of an exemplary drain clearing device according to an aspect of the present invention.

Referring now to FIG. 1, a drain clearing device according to an aspect of the present invention is shown generally at 10. The drain clearing device 10 has a reservoir end 18 and an outlet end 20, and the exterior of the drain clearing device 10 is defined by a main body 12, a cartridge cavity closure cap 14, an outlet end cap (not shown in FIG. 1) and an outlet fitting 16.

Figure 2:
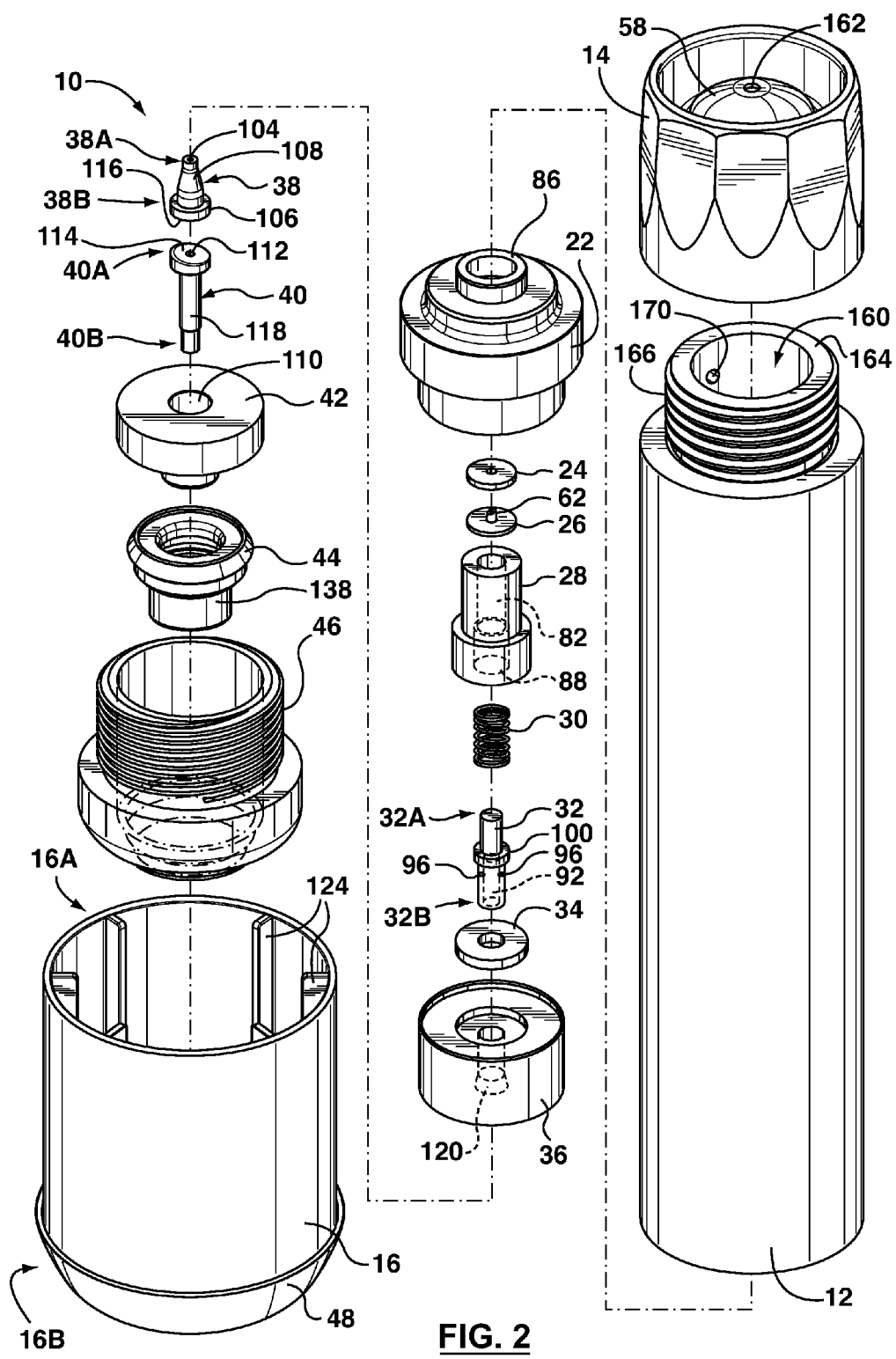
FIG. 2 is an exploded view of the drain clearing device of FIG. 1.

Turning now to FIG. 2, the external and internal components of the drain clearing device 10 are shown in exploded view. Received within the main body 12 are a cartridge receiving member 22, a cartridge seal 24, a cartridge piercer 26, a fluid chamber member 28, a plunger biasing member 30 (a coil spring in the exemplary embodiment shown), a plunger 32, a fluid chamber seal 34, a guide collar 36, a plunger actuator 38, a driver 40, a driver receiver member 42 and a grommet 44, and the outlet end cap 46 retains the foregoing components within the main body 12. The main body 12, the cartridge receiving member 22, the fluid chamber member 28, the guide collar 36, driver receiver member 42 and outlet end cap 46 each form part of an overall housing. As can be seen, the cartridge cavity closure cap 14 and the outlet end cap 46 are threadedly received by the main body 12, and the outlet fitting 16 includes an end piece 48.

Figure 3:
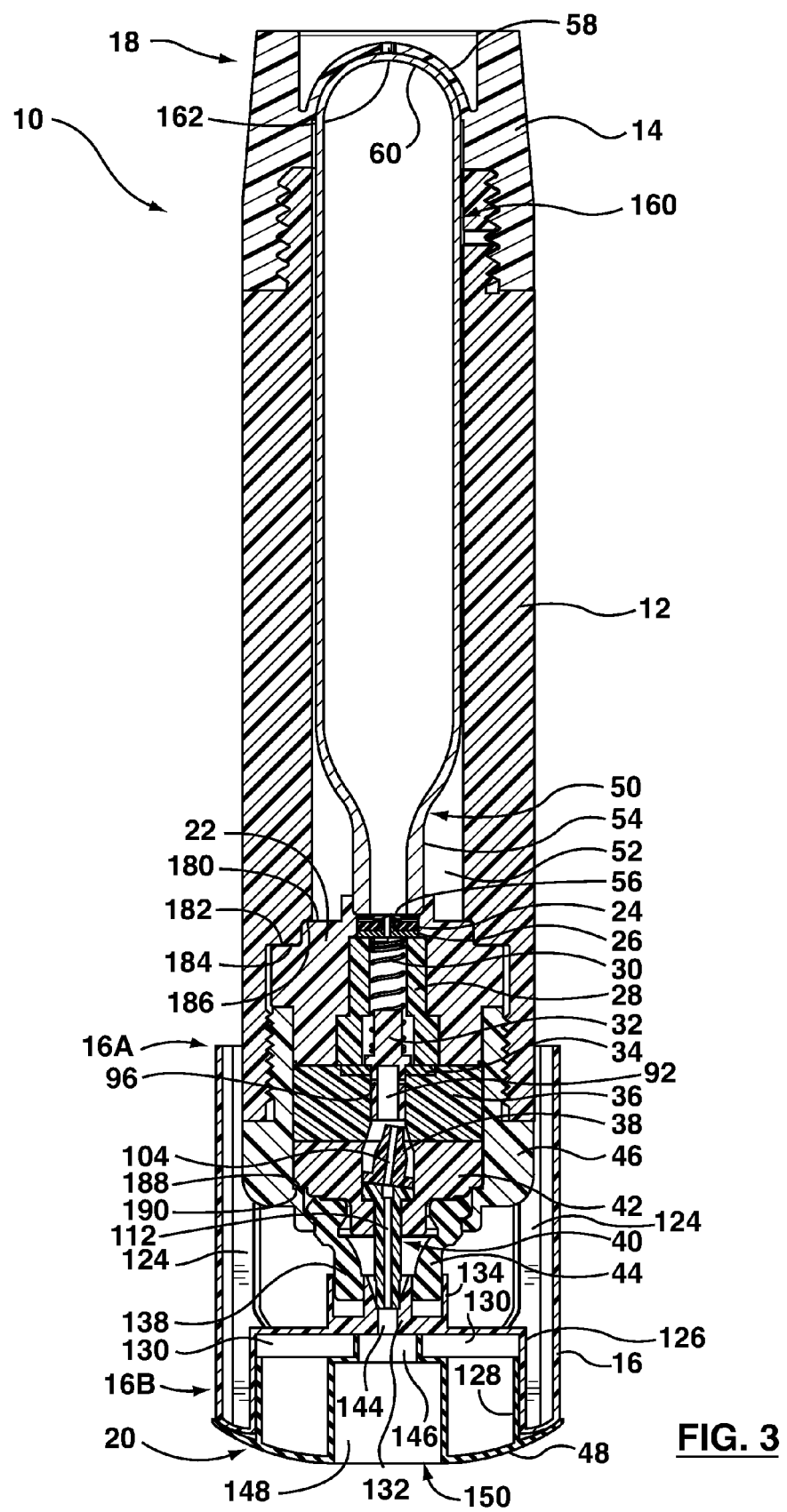
FIG. 3 is a cross-sectional view of the drain clearing device of FIG. 1, showing overall assembly thereof.

With reference now to FIG. 3, assembly of the various components is shown. When in use, a fluid cartridge 50 is removably received within a cartridge cavity 52 defined in the main body 12 of the drain clearing device 10. The fluid cartridge 50 is thus a reservoir of fluid, which (as will be described in greater detail below) can be selectively expelled from the outlet 150 at the outlet end 20 of the drain clearing device 10 to assist in clearing a blockage in a drain. The fluid cartridge 50 is preferably a carbon dioxide ($CO_2$) cartridge of conventional design, comprising a generally cylindrical metal canister 54 of sufficient strength and having a quantity of pressurized $CO_2$ contained therein, and having a thin metal seal 56 at an outlet end thereof. To install the fluid cartridge, a user would unscrew the cartridge cavity closure cap 14, slide the fluid cartridge 50 through the cartridge insertion aperture 160 into the cartridge cavity 52 in the main body 12 of the drain clearing device 10, and then thread the cartridge cavity closure cap 14 back onto the main body 12. The cartridge cavity closure cap 14 has a cradle 58 complementary to the spherical shape of the non-outlet end 60 of the fluid cartridge 50 for engaging the non-outlet end 60 of the fluid cartridge 50. The cartridge piercer 26 is disposed at the opposite end of the cartridge cavity 52 from the cartridge insertion aperture 160, and thus as the cartridge cavity closure cap 14 is tightened onto the main body 12, the fluid cartridge 50 is forced toward the outlet end 20 of the drain clearing device 10 until the seal 56 is pierced by the cartridge piercer 26, allowing the fluid contained in the fluid cartridge 50 to flow into the valve mechanism, which is described in greater detail below in respect of FIGS. 3A to 3D. As can be seen, the piercing cannula 62 of the cartridge piercer 26 has a generally frusto-conical shape terminating in an angular plane to define a piercing edge. Without being limited by theory, it is believed that the generally frusto-conical shape the piercing cannula 62 facilitates sealing of the cartridge 50 against the piercing cannula 62. It has been found that a relatively short piercing cannula 62 is desirable, so that it is the last three-quarters of a revolution of the cartridge cavity closure cap 14 which causes the seal 56 to be pierced.

Once the quantity of fluid (preferably $CO_2$) contained in a given fluid cartridge 50 has been exhausted, or the pressure in the fluid cartridge 50 has been reduced so that it is insufficient for its purpose (e.g. clearing a drain), the cartridge cavity closure cap 14 can be unscrewed from the main body 12, and the fluid cartridge 50 can be removed and replaced with a new fluid cartridge 50. Thus, a drain clearing device such as the exemplary drain clearing device 10 is reusable. In addition, depending on the particular construction of the fluid cartridges 50, the fluid cartridges 50 may optionally be refilled and resealed for reuse, or may be recycled.

For use in a drain clearing device, different sizes of fluid cartridges 50, containing different amounts of fluid, may be advantageous. Three exemplary sizes of fluid cartridges containing different quantities of $CO_2$ gas are illustrated in FIGS. 5A to 5C.

Figures 5A, 5B, 5C:
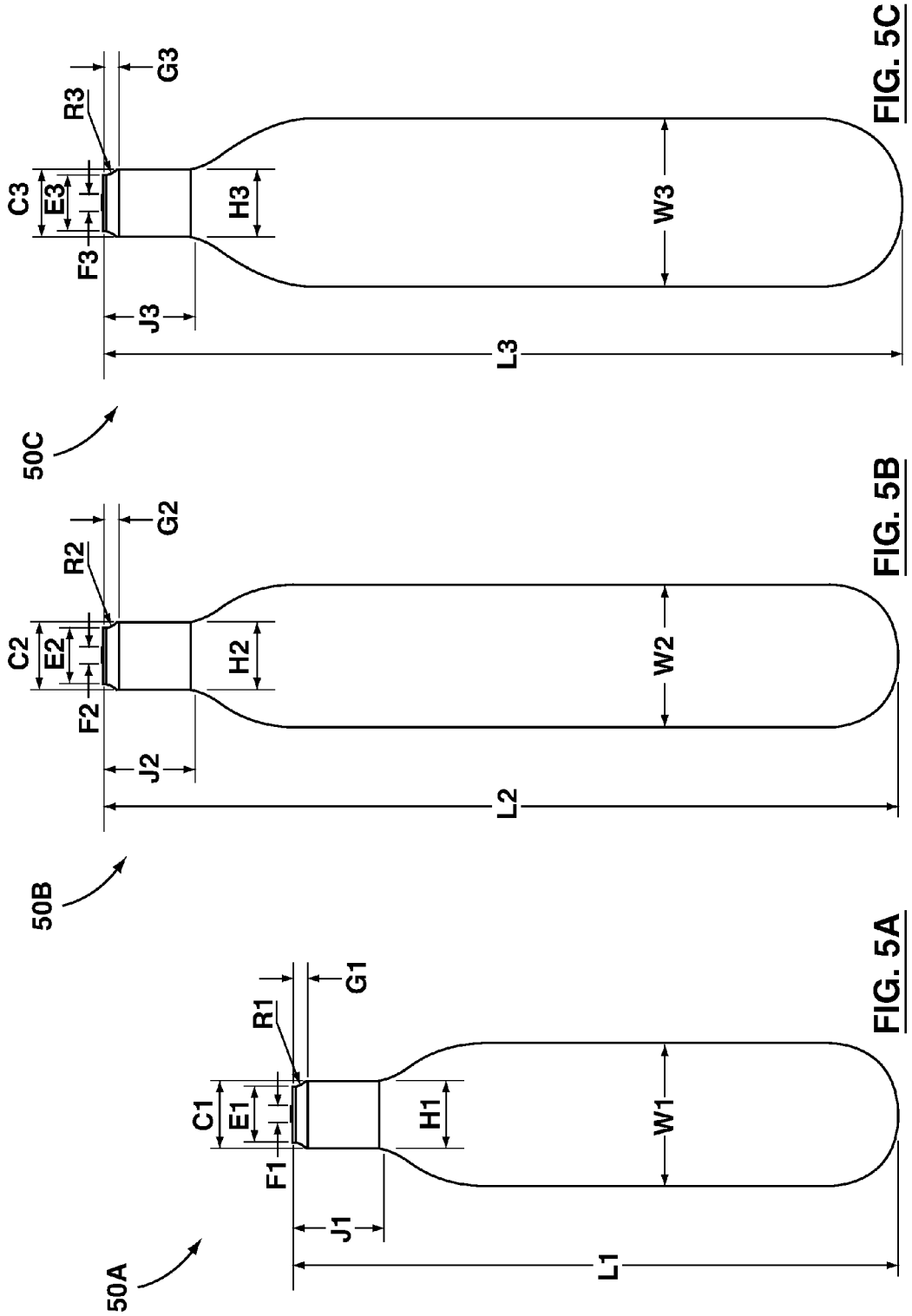
FIG. 5A shows a first exemplary embodiment of a fluid cartridge.
FIG. 5B shows a second exemplary embodiment of a fluid cartridge.
FIG. 5C shows a third exemplary embodiment of a fluid cartridge.

FIG. 5A shows first exemplary fluid cartridge 50A, which would initially contain 25 grams of $CO_2$ at a pressure of approximately 850 pounds per square inch (approximately 60 bar). The dimensions of the first exemplary fluid cartridge 50A are as follows:

| Dimension | Measurement (millimeters) |
| --- | --- |
| C1 | 12.0 |
| E1 | 10.5 |
| F1 | 3.0 |
| G1 | 2.4 |
| H1 | 12.5 |
| J1 | 16.5 |
| L1 | 109.0 |
| R1 (radius) | 5.0 |
| W1 | 25.4 |

FIG. 5B shows second exemplary fluid cartridge, which would initially contain 33 grams of $CO_2$ at a pressure of approximately 850 pounds per square inch (approximately 60 bar). The dimensions of the second exemplary fluid cartridge are as follows:

| Dimension | Measurement (millimeters) |
| --- | --- |
| C2 | 12.0 |
| E2 | 10.5 |
| F2 | 3.0 |
| G2 | 2.4 |
| H2 | 12.5 |
| J2 | 16.5 |
| L2 | 142.0 |
| R2 (radius) | 5.0 |
| W2 | 25.4 |

FIG. 5C shows third exemplary fluid cartridge, which would contain 45 grams of $CO_2$ at a pressure of approximately 850 pounds per square inch (approximately 60 bar). The dimensions of the third exemplary fluid cartridge are as follows:

| Dimension | Measurement (millimeters) |
| --- | --- |
| C3 | 12.0 |
| E3 | 10.5 |
| F3 | 3.0 |
| G3 | 2.4 |
| H3 | 12.5 |
| J3 | 16.5 |
| L3 | 142.0 |
| R3 (radius) | 5.0 |
| W3 | 30.0 |

Depending on the exemplary fluid cartridge to be used, the dimensions of the cartridge cavity 52, cartridge cavity closure cap 14 other components of the drain clearing device 10 would be adapted accordingly.

Referring now to FIGS. 3A to 3D, a valve mechanism forming part of a drain clearing device according to an aspect of the present invention is indicated generally by the reference numeral 80. The valve mechanism 80 comprises a housing which, as described above, includes the cartridge receiving member 22, the fluid chamber member 28, the guide collar 36 and the driver receiver member 42, as well as the piercer 26 and the fluid chamber seal 34. The valve mechanism 80 further comprises the plunger biasing member 30, the plunger 32, the plunger actuator 38 and the driver 40.

A fluid chamber 82 is defined within the housing, and in the illustrated embodiment is defined by the hollow interior volume of the fluid chamber member 28. A fluid chamber inlet 84 into the fluid chamber 82 is defined at the inlet end 28A of the fluid chamber member 28 by a passageway 84 in the piercing cannula 62 of the cartridge piercer 26, so that the interior volume of the fluid chamber 82 is in fluid communication with the interior of the fluid cartridge 50 when the same is installed. In the illustrated embodiment, the cartridge piercer 26 is friction fit into a receiving collar 86 at the inlet end 22A of the cartridge receiving member 22, and is supported by the annular edge of the input end 28A of the fluid chamber member 28. The cartridge seal 24 is friction fit into the receiving collar 86 on top of the cartridge piercer 26 to surround the piercing cannula 62. Other suitable arrangements for installing the cartridge piercer 26 and cartridge seal 24 may also be used, without departing from the scope of the present invention.

An opening 90 at the outlet end 28B of the fluid chamber member 28 cooperates with the fluid chamber seal 34 to define a plunger aperture 88 in the fluid chamber 82. The plunger 32 is slidably received in the plunger aperture 88 in sealing engagement therewith, as will be described in greater detail below.

The plunger 32 has a closed end 32A and a plunger outlet end 32B. A plunger fluid passage 92 extends partially along a length of the plunger 32 from the plunger outlet end 32B. A peripheral rim 94 surrounds the plunger fluid passage 92 at the plunger outlet end 32B. The plunger has two diametrically opposed plunger inlets 96 defined in a longitudinal wall 98 thereof in fluid communication with the plunger fluid passage 92. In alternate embodiments, the plunger 32 may have only one plunger inlet, or may have more than two plunger inlets.

As noted above, the plunger 32 is slidably received in the plunger aperture 88. Frictional engagement of an inner annular surface of the fluid chamber seal 34 with the exterior of the longitudinal wall 98 of the plunger 32 inhibits the undesired escape of fluid from the fluid chamber 82, so that the plunger 32 is in sealing engagement with the plunger aperture 88. The closed end 32A of the plunger 32 is disposed within the interior volume of the fluid chamber 82, and the plunger 32 is movable between a fluid retention position (shown in FIG. 3A) in which the plunger inlets 96 are isolated from the interior volume of the fluid chamber 82, and a fluid release position (shown in FIG. 3C) in which the plunger inlets 96 are in fluid communication with the interior volume of the fluid chamber 82. The plunger 32 has an annular stop 100 which cooperates with an annular shoulder 102 inside the fluid chamber member 28 and with the fluid chamber seal 34 and the guide collar 36 to limit the axial range of motion of the plunger 32 and thereby define the fluid retention position and fluid release position. The annular stop 100 also serves as an engagement surface for the plunger biasing member 30.

Figure 3A:
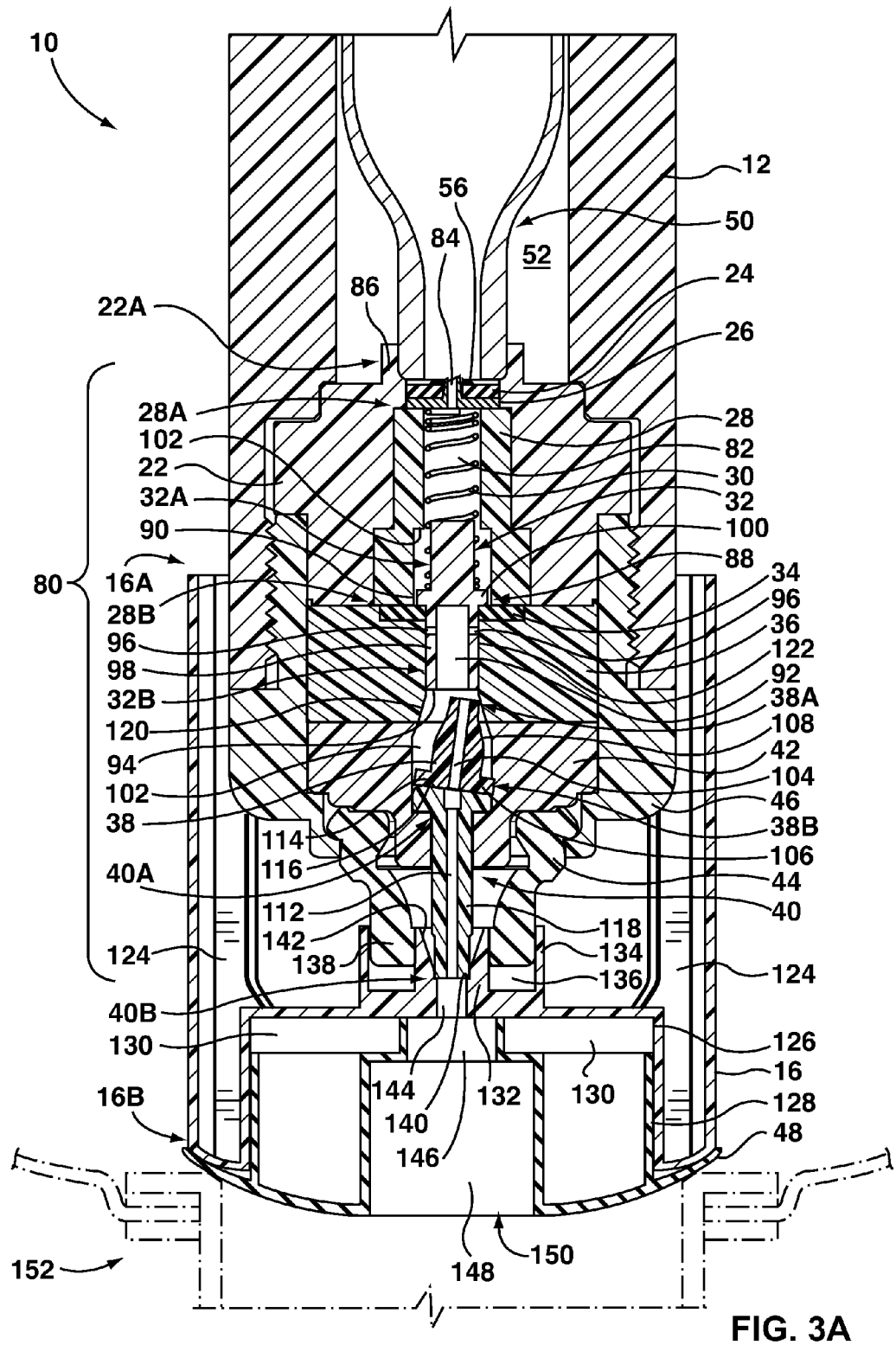
FIG. 3A is a cross-sectional view of a portion of the drain clearing device of FIG. 1, prior to commencement of a stroke of a driver thereof toward a fluid chamber thereof.

As shown in FIG. 3A, the plunger biasing member 30 acts between the plunger 32, specifically the annular stop 100, and the housing, in particular the annular rim of the cartridge piercer 26, to urge the plunger into the fluid retention position in which the annular stop 100 abuts the fluid chamber seal 34. When the plunger 32 is in the fluid retention position, the plunger inlets 96 are outside of the fluid chamber 82 and are therefore isolated therefrom. Conversely, when the plunger 32 is in the fluid release position, as shown in FIG. 3C, the plunger inlets 96 are inside the fluid chamber 82 and therefore are in fluid communication with the interior volume of the fluid chamber 82.

As noted above, the valve mechanism 80 further includes the plunger actuator 38, which is received within the housing between the plunger 32 and the driver 40. More particularly, in the illustrated embodiment the plunger actuator 38 is received in an interior space 102 defined within the guide collar 36 and the driver receiver member 42. The plunger actuator 38 has a plunger actuator inlet end 38A and a plunger actuator outlet end 38B, and a plunger actuator fluid passage 104 extends through the plunger actuator 38 between the plunger actuator inlet end 38A and the plunger actuator outlet end 38B. The plunger actuator 38 is positioned with the plunger actuator inlet end 38A facing toward the plunger 32 and the plunger actuator outlet end 38B facing generally toward the driver 40.

The plunger actuator inlet end 38A is narrower than the plunger actuator outlet end 38B, and the plunger actuator inlet end 38A is sized to fit within the plunger fluid passage 92. The plunger actuator outlet end has an annular flange 106, and the outer surface 108 of the plunger actuator 38 smoothly tapers from a position axially inward of the annular flange 106 to a position axially inward of the plunger actuator outlet end 38B. In the illustrated embodiment, the plunger actuator 38 is not slidingly received within the interior space 102, but has a small amount of play so that it can shift in and out of coaxiality with the other components of the valve mechanism 80, as will be described in detail below.

Continuing to refer to FIGS. 3A to 3D, the driver 40 is slidingly received within a central aperture 110 (FIG. 2) in the driver receiver member 42. The driver has a driving end 40A and a driver outlet end 40B, and a driver fluid passage 112 extends through the driver 40 between the driving end 40A and the driver outlet end 40B.

The driving end 40A of the driver 40 has a driver engagement face 114, and the plunger actuator outlet end 38B has a plunger actuator engagement face 116. The driver engagement face 114 is shaped to direct the plunger actuator inlet end 38A to engage the peripheral rim 94 at the plunger outlet end 32B during the first portion of the stroke of the driver 40 towards the fluid chamber when the valve mechanism is oriented with the plunger actuator above the driver (as is the case in FIGS. 3A to 3D). In the illustrated embodiment, the driver engagement face 114 and the plunger actuator engagement face 116 are both generally planar, and the driver engagement face 114 is angled away from being perpendicular to the axis of the driver 40 as defined by its shaft 118 (and hence is angled away from perpendicular to the direction of the stroke of the driver 40, as will be described below). As a result of the angling of the driver engagement face 114, when the valve mechanism 80 is oriented with the plunger actuator 38 above the driver 40, the axis of the plunger actuator 38 is non-parallel to the shaft 118 of the driver, and the plunger actuator inlet end 38A is out of alignment with the plunger fluid passage 92 at the plunger outlet end 32B. Accordingly, as long as the valve mechanism 80 is oriented with the plunger actuator 38 above the driver 40, during the first portion of the stroke of the driver 40 towards the fluid chamber 82, the angle of the driver engagement face 114 will direct the plunger actuator inlet end 38A away from the fluid passage 92 and into engagement with the peripheral rim 94 surrounding the plunger fluid passage 92 at the plunger outlet end 32B.

Although in the illustrated embodiment it is the driver engagement face 114 that is angled away from being perpendicular to the axis of the driver 40, in other embodiments the driver engagement face 114 may be perpendicular to the axis of the driver 40 and the plunger actuator engagement face 116 may be angled away from perpendicular to the axis of the plunger actuator 38. Alternatively, both components may be angled, with the driver engagement face 114 angled relative to the axis of the driver 40 and the plunger actuator engagement face 116 angled relative to the axis of the plunger actuator 38, to achieve the same effect.

In an alternative embodiment (not shown), the driver engagement face may be perpendicular to the axis of the driver and the plunger actuator engagement face may be perpendicular to the axis of the plunger actuator, and either of the driver engagement face or the plunger actuator engagement face may have a projection thereon so that when the valve mechanism is oriented with the plunger actuator above the driver, the axis of the plunger actuator is non-parallel to the shaft of the driver, and the plunger actuator inlet end is out of alignment with the plunger fluid passage 92 at the plunger outlet end 32B. Such a projection could take the form of a ridge or bump on one side of the driver engagement face or plunger actuator engagement face, or either of the driver engagement face or the plunger actuator engagement face may be a hemispherical surface while the other is a substantially planar surface perpendicular to the axis of the respective component.

The angling of the driver engagement face 114 away from perpendicular to the axis of the driver 40 (or angling of the plunger actuator engagement face 114, or both, or other shaping of one or both parts for directing the plunger actuator inlet end 38A away from the fluid passage 92 and into engagement with the peripheral rim 94) forms part of a guide mechanism for guiding the plunger actuator 38 into engagement with the plunger 32 to cause the plunger 32 and the plunger actuator 38 to move in unison and move the plunger 32 into the fluid release position during a first portion of the stroke of the driver 40 towards the fluid chamber 84.

The guide mechanism is also operable to guide the plunger actuator inlet end 38A to permit the plunger 32 to return to the fluid retention position under urging from the plunger biasing member 30 during the second portion of the stroke of the driver 40 towards the fluid chamber 82 when the valve mechanism 80 is oriented with the plunger actuator 38 above the driver 40. To this end, the guide mechanism further comprises a guide channel 120 defined in the housing.

The guide channel 120 is defined primarily within the guide collar 36, which also includes a plunger bore 122 which slidingly receives the plunger outlet end 32B; a portion of the guide channel 120 is also disposed in the driver receiver member 42 immediately adjacent the guide collar 36. The guide channel 120 has a narrow end adjacent the plunger bore 122 and a wide end within the driver receiver member 42, and the guide channel 120 is coaxial with the plunger bore 122. The guide channel 120 tapers between the wide end and the narrow end. When the valve mechanism 80 is oriented with the plunger actuator 38 above the driver 40, the guide channel 120 will, by way of its position within the housing and the shape of its surface, guide the plunger actuator inlet end 38A into registration with the plunger fluid passage 92 during the second portion of the stroke of the driver 40 towards the fluid chamber 82. More particularly, as the driver 40 moves into the second portion of its stroke towards the fluid chamber 82, the smoothly tapered outer surface 108 of the plunger actuator 38 will engage the tapered surface of the guide channel 120, centering the plunger actuator 38 within the guide channel 120 so that it is coaxial therewith and hence also coaxial with the plunger bore 122. Since the plunger actuator inlet end 38A is narrower than the plunger fluid passage 92, the aforesaid centering action brings the plunger actuator inlet end 38A into registration with the plunger fluid passage 92.

The drain clearing device 10 includes an external actuator. In the illustrated embodiment, the external actuator is the outlet fitting 16, including the end piece 48, which is preferably made from a resilient material to assist in sealing against a drain, such as exemplary drain 152. As can be seen in FIGS. 3A to 3D, the end piece 48 has a truncated dome shape, which, because the end piece 48 is resilient, enables the outlet fitting 16 (including the end piece 48) to sealingly engage a drain, such as the exemplary drain 152.

The outlet fitting 16 has a generally cylindrical outer surface, and has a plurality of circumferentially spaced, inwardly projecting radial ribs 124 which strengthen the outlet fitting 16 and assist in centering it about the main body 12 when installed. The outlet end 16B of the outlet fitting 16 has a cylindrical recess 126 which receives a correspondingly sized outer cylindrical wall 128 on the end piece 48 in a friction fit, so as to secure the end piece 48 to the outlet fitting 16. A plurality of radially spaced, generally sector-shaped spokes 130 are defined in the floor of the cylindrical recess 126, and provide additional support for the ribs 124.

Concentrically spaced inner and outer cylindrical mounting walls 132, 134 on the outlet fitting 16 project toward the inlet end 16A thereof, and define an annular mounting recess 136 therebetween. The annular mounting recess 136 receives the hollow cylindrical mounting end 138 of the resilient grommet 44 in a friction fit, thereby movably securing the outlet fitting 16 to the housing of the drain clearing device 10.

An annular driver engagement shoulder 140 is defined in the inner surface 142 of the inner cylindrical mounting wall 132, which engages the driver outlet end 40B of the driver 40. To this end, the driver outlet end 40B has a slightly smaller diameter than the rest of the driver shaft 118. This engagement between the driver engagement shoulder 140 and the driver outlet end 40B mechanically couples the outlet fitting 16 to the driver 40, so that when the outlet fitting 16 moves toward the fluid chamber 82, it will cause axial, sliding movement of the driver 40 within the driver receiver member 42. The inner surface 142 of the inner cylindrical mounting wall 132 is sloped so that it is wider toward the inlet end 16A of the outlet fitting 16 and narrower toward the outlet end 16B of the outlet fitting 16, which assists in guiding the driver outlet end 40B of the driver 40 into engagement with the annular driver engagement shoulder 140 during installation of the outlet fitting 16.

An outlet fitting fluid passage 144 is defined in the floor of the cylindrical recess 126 and, when the driver outlet end 40B engages the annular driver engagement shoulder 140, the outlet fitting fluid passage 144 is in fluid communication with the driver fluid passage 112. When the end piece 48 is installed on the outlet fitting 16, the outlet fitting fluid passage 144 opens into a first cylindrical fluid passage 146 in the end piece 48, which in turn opens into a second, wider cylindrical fluid passage 146 in the end piece 48, which defines an overall outlet aperture 150 for the drain clearing device 10.

Operation of an exemplary drain clearing device 10 according to an aspect of the present invention will now be described with respect to FIGS. 3A to 3D. Generally speaking, to use the exemplary drain clearing device 10, a user would position it so that the outlet end 16A of the outlet fitting 16 seals the drain to be cleared, and then apply downward pressure, for example by grasping the main body 12 and pushing it towards the drain 150, thereby also pushing the main body 12 into the outlet fitting 16.

In FIG. 3A, the drain clearing device has been placed against an exemplary drain 152, so that the outlet fitting 16, and more particularly the resilient end piece 48, is positioned to seal the mouth of the drain 152. No pressure has yet been applied. When clearing a drain with a drain clearing device such as drain clearing device 10, the water level in the sink whose drain is to be cleared should generally be high enough to at least cover the end piece 48 (typically about one inch of water). In addition, where the obstructed drain is part of a double sink, the second drain aperture (i.e. the drain aperture with which the drain clearing device is not being used) should be temporarily obstructed to avoid undesirable backflow.

As can be seen, the valve mechanism 80 is oriented with the plunger actuator 38 above the driver 40, and under the influence of gravity, the plunger actuator 38 rests on the driver 40, with the plunger actuator engagement face 116 in planar engagement with the driver engagement face 114. Because the driver engagement face 114 is angled away from being perpendicular to the axis of the driver 40 as defined by its shaft 118 (and hence is angled away from perpendicular to the direction of the stroke of the driver 40, as will be described below), the axis of the plunger actuator 38 is non-parallel to the shaft 118 of the driver, and the plunger actuator inlet end 38A is out of alignment with the plunger fluid passage 92 at the plunger outlet end 32B.

Figure 3B:
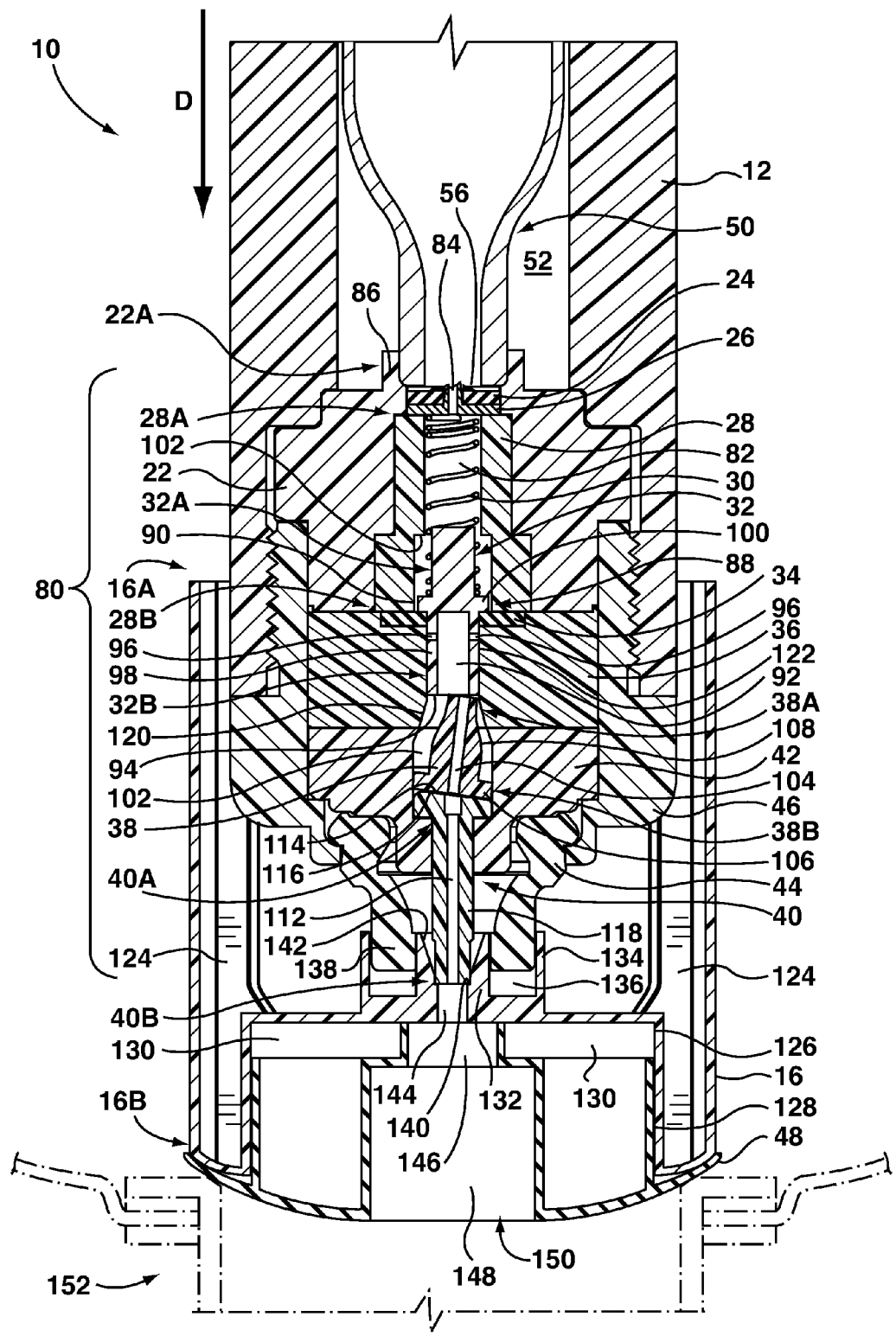
FIG. 3B is a cross-sectional view of a portion of the drain clearing device of FIG. 1, during an initial stage of a first portion of the stroke of the driver thereof toward the fluid chamber thereof.
Figure 3C:
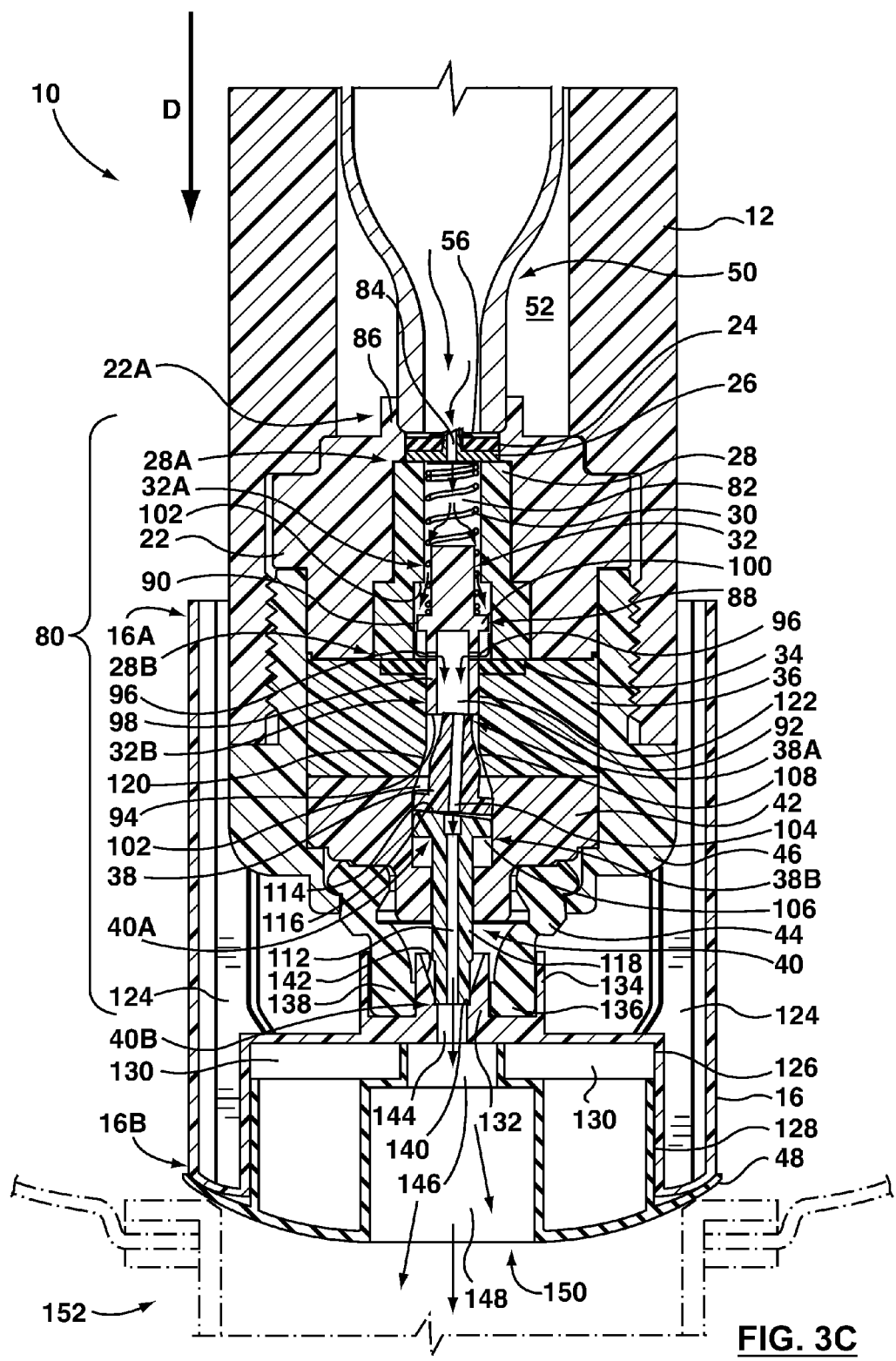
FIG. 3C is a cross-sectional view of a portion of the drain clearing device of FIG. 1, during a subsequent stage of a first portion of the stroke of the driver thereof toward the fluid chamber thereof.

Reference is now made to FIG. 3B, which shows an initial stage of the first portion of the stroke of the driver 40 towards the fluid chamber 82. As a user applies downward pressure (indicated by the arrow "D") to the main body 12, the main body will move downward relative to the outlet fitting 16, which is braced against the exemplary drain 152. This downward movement of the main body 12 relative to the outlet fitting 16 compresses the resilient grommet 44. Viewed another way, the outlet fitting 16 moves upward relative to the main body 12.

Because the annular driver engagement shoulder 140 inside the outlet fitting 116 engages the driver outlet end 40B of the driver 40, the outlet fitting 16 is mechanically coupled thereto, and the relative movement of the outlet fitting 16 toward the main body 12 (and hence toward the fluid chamber 82) causes a corresponding sliding movement of the driver 40 within the driver receiver member 42, also toward the fluid chamber 82. In turn, because the plunger actuator 38 rests on the driving end 40A of the driver 40, the movement of the driver 40 toward the fluid chamber 82 causes the plunger actuator to move toward the toward the fluid chamber 82, and hence toward the plunger 32. As the plunger actuator 32 moves toward the plunger 32, the angle of the driver engagement face 114 will direct the plunger actuator inlet end 38A away from the plunger fluid passage 92 and into engagement with the peripheral rim 94 surrounding the plunger fluid passage 92 at the plunger outlet end 32B. During this initial stage of the first portion of the stroke of the driver 40 towards the fluid chamber 82, pressurized fluid in the fluid chamber 82 is trapped therein by cooperation of the annular stop 100 on the plunger 32 and the fluid chamber seal 34.

As the driver 40 continues to move through the first portion of its stroke and continues to push the plunger actuator 38 towards the plunger 32, the plunger actuator inlet end 38A engages the peripheral rim 94 at the plunger outlet end 32A. The engagement of the plunger actuator inlet end 38A with the peripheral rim 94 results in motion of the driver 40, during the remainder of the first portion of its stroke toward the fluid chamber 82, causing the plunger actuator 38 and the plunger 32 and to move in unison toward the fluid chamber 82. During this subsequent stage of the first portion of the stroke of the driver 40 towards the fluid chamber 82, even though the plunger 32 is moving into the fluid chamber 82, the pressurized fluid remains substantially trapped in the fluid chamber 82 by the fluid chamber seal 34.

Turning now to FIG. 3C, which shows the final stage of the first portion of the stroke of the driver 40 toward the fluid chamber 82, the driver 40 has driven the plunger actuator 38 to push the plunger 32 into the fluid release position, with the plunger inlets 96 in fluid communication with the interior volume of the fluid chamber 82. As can be seen in FIG. 3C, with the plunger 32 in the fluid release position, the plunger fluid passage 92 is in fluid communication with the plunger actuator fluid passage 104, and the plunger actuator fluid passage 104 is in fluid communication with the driver fluid passage 112. As a result, pressurized fluid in the fluid chamber 82 is able to escape therefrom by passing through the plunger inlets 96 into the plunger fluid passage 92, from the plunger fluid passage 92 into the plunger actuator fluid passage 104, from the plunger actuator fluid passage 104 into the driver fluid passage 112, and then from the driver fluid passage 112 into the outlet fitting fluid passage 144, and finally through the first and second fluid passages 146, 148 in the end piece 46 and hence through the outlet aperture 150 and into the drain 152, as indicated by the arrows showing the fluid flow path. Thus, the fluid, so long as it is sufficiently pressurized, will assist in clearing a blockage downstream of the drain. Pressure within the fluid chamber 82 is maintained by inflow of pressurized fluid from the fluid cartridge 50 by way of the fluid chamber inlet 84.

A valve mechanism 80 according to an aspect of the present invention provides for mechanical timing and metering of the amount of fluid released, because the plunger 32 is returned from the fluid release position to the fluid retention position as the stroke of the driver 40 toward the fluid chamber is completed.

Figure 3D:
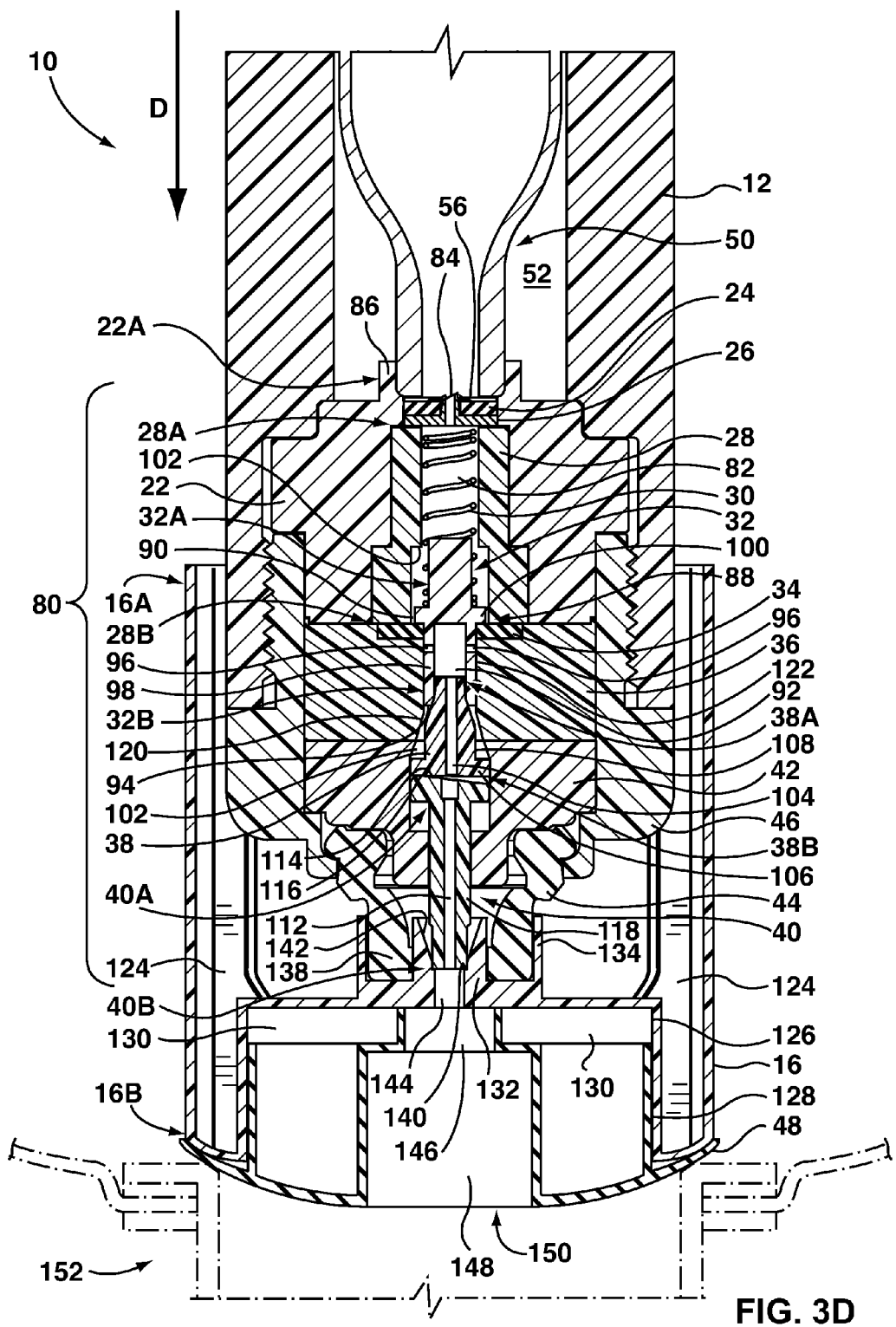
FIG. 3D is a cross-sectional view of a portion of the drain clearing device of FIG. 1, during completion of a second portion of the stroke of the driver thereof toward the fluid chamber thereof.

With reference now to FIG. 3D, as the driver 40 continues into the second portion of its stroke toward the fluid chamber 82, the plunger actuator 38 also continues to move toward the fluid chamber 82. As the plunger actuator 38 continues to move toward the fluid chamber 82, the smoothly tapered outer surface 108 of the plunger actuator 38 engages the tapered surface of the guide channel 120, centering the plunger actuator 38 within the guide channel 120 and thereby bringing the plunger actuator inlet end 38A into registration with the plunger fluid passage 92. Because the plunger actuator inlet end 38A is narrower than the plunger fluid passage 92, as the driver 40 continues to push the plunger actuator 38 toward the fluid chamber 82, the plunger actuator inlet end 38A is received within the plunger fluid passage 92. This permits sliding movement of the plunger 32 toward the plunger actuator, since such movement is no longer obstructed by engagement of the plunger actuator inlet end 38A with the peripheral rim 94 at the plunger outlet end 32B. Thus, as the driver 40 completes the second portion of its stroke toward the fluid chamber 82, the biasing member 30 urges the plunger 32 away from the fluid chamber 82, with the plunger actuator inlet end 38A received within the plunger fluid passage 92. The plunger 32 is now back into the fluid retention position, with the plunger inlets 96 outside of, and hence isolated from, the fluid chamber 82. Pressurized fluid in the fluid chamber 82 is once again trapped therein by cooperation of the annular stop 100 on the plunger and the fluid chamber seal 34.

The exemplary valve mechanism 80 described herein provides for a timed and metered fluid release, because a single stroke of the driver 40 towards the fluid chamber 82 will release a limited, measured, quantity of fluid, no matter how long the driver 40 is maintained in position at the completion of its stroke. More particularly, continuing to push the driver 40 toward the fluid chamber 82 does not release any additional fluid, because fluid is released only during the first portion of the stroke, and the plunger 32 has returned to the fluid retention position by the time the stroke is completed. Thus, continuing to push the main body 12 toward the outlet fitting 16 will not release more fluid than the metered amount.

The amount of fluid released is limited by the size of the plunger inlets 96, and by the parameters of the plunger 32, plunger actuator 38 and driver 32, which determines how long the plunger will remain in the fluid release position during a given stroke of the driver 40 toward the fluid chamber 82. Where a valve mechanism according to the present invention is to be used in a drain clearing device, as herein shown and described, the cartridge pressure and other parameters should be selected so that the amount of fluid discharged on a singly stroke is sufficient to clear at least a typical drain blockage from a typical drain, but not so much as to damage the drain. While the speed of the stroke will affect this duration somewhat (i.e. a slower stroke may release slightly more fluid than a longer stroke), as long as sufficient force is applied to the driver these variations are unlikely to be significant. For example, where a valve mechanism according to an aspect of the present invention is used in a drain clearing device as illustrated, any variations resulting from differences in the speed/force with which a user pushes the main body 12 toward the outlet fitting 16 while the outlet fitting 16 engages a drain 152 are unlikely to adversely effect operation of the device. Because the fluid output is metered, multiple fluid discharges from a single fluid cartridge 50 are possible.

Following completion of the stroke of the driver 40 towards the fluid chamber 82, as shown in FIG. 3D, upon release of downward pressure on the main body 12, the resilient grommet 44 will push the outlet fitting 16 away from the main body 12 and return the main body 12 and the outlet fitting 16 to their original relative positions. This releases the external force acting on the driver 40 (by way of the annular driver engagement shoulder 140 in the outlet fitting 16) and driver 40 and the plunger actuator 38 to return to their respective pre-stroke positions (FIG. 3A) under gravity when the valve mechanism 80 is oriented with the plunger actuator 38 above the driver 40. The valve mechanism 80 is now ready for a new stroke of the driver 40 toward the fluid chamber 82.

Figure 4A:
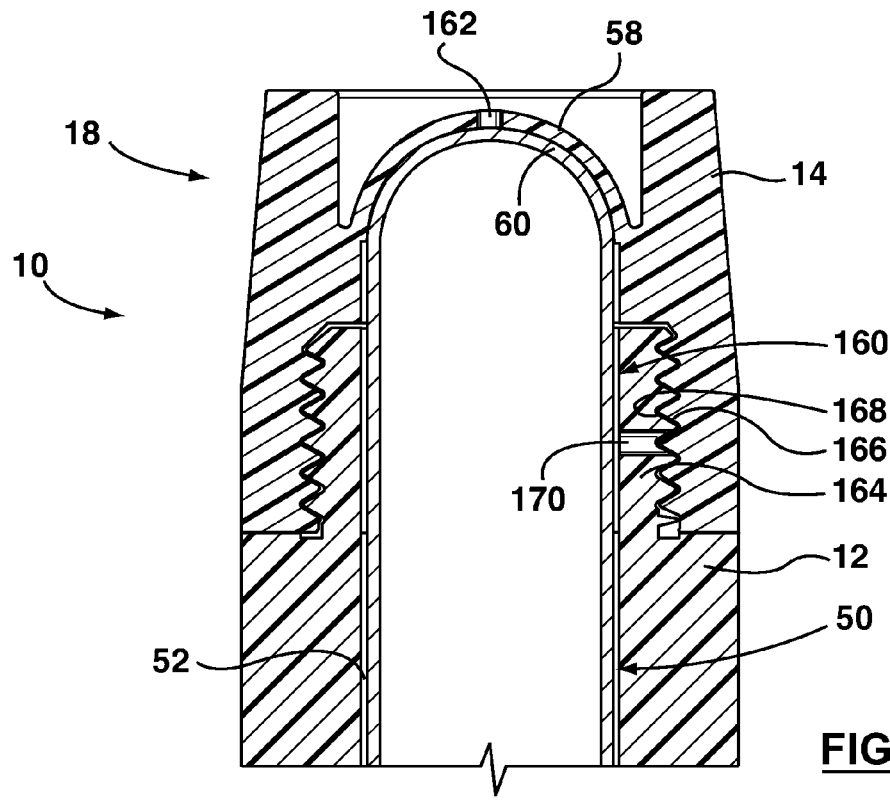
FIG. 4A is a cross-sectional view of an upper portion of the drain clearing device of FIG. 1, with a cartridge cavity closure cap secured to a main body of the drain clearing device.
Figure 4B:
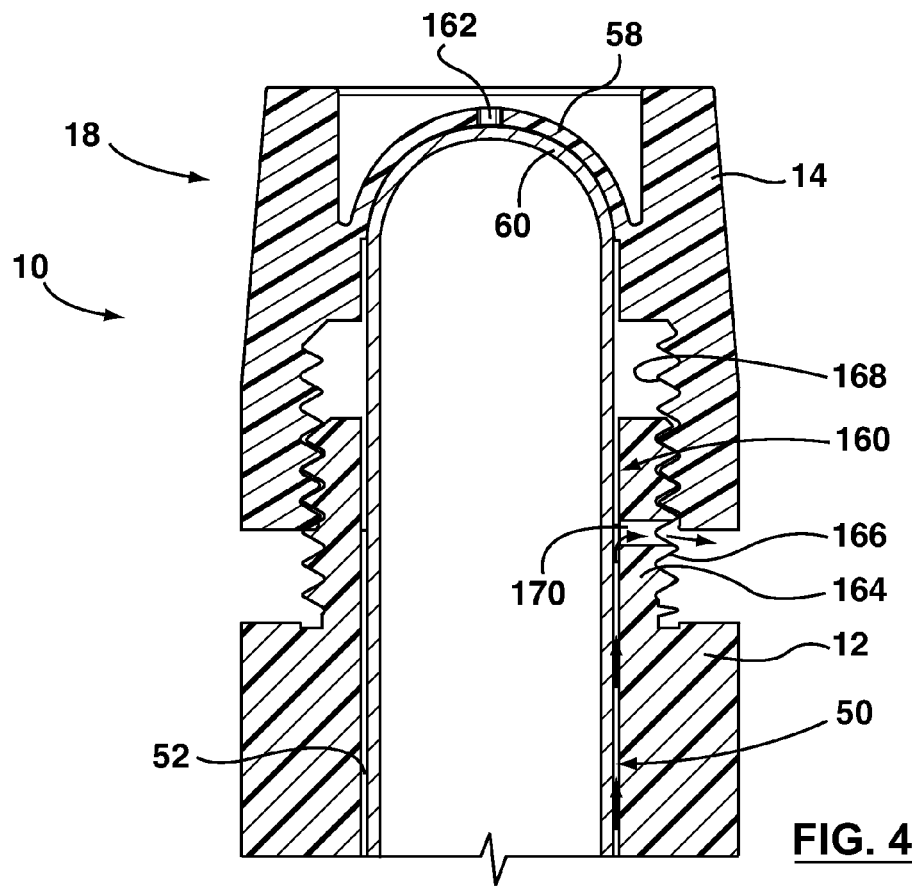
FIG. 4B is a cross-sectional view of an upper portion of the drain clearing device of FIG. 1, with the cartridge cavity closure cap partially removed and still threadedly secured to the main body of the drain clearing device.

Reference is now made to FIGS. 4A and 4B. As noted above, in the exemplary embodiment a fluid cartridge 50 is received within a cartridge cavity 52 defined in the main body 12 of the drain clearing device 10. More particularly, the main body 12 defines a cartridge insertion aperture 160 at one end of the main body 12, namely the reservoir end 18 of the drain clearing device 10. As was explained above, the cartridge piercer 26 (not shown in FIGS. 4A and 4B) is located at the opposite end of the cartridge cavity 52 from the cartridge insertion aperture 160, so that as the cartridge cavity closure cap 14 is secured to the main body 12, it will obstruct the cartridge insertion aperture 16 and push the thin metal seal 56 at the outlet end of the fluid cartridge 50 into engagement with the cartridge piercer 26. At the same time, securing the cartridge cavity closure cap 14 to the main body 12 will close the cartridge cavity 52. In this context, the term "close" denotes a seal which, while not necessarily a perfect hermetic seal, generally maintains the pressure in the cartridge cavity 52 and permits only very small amounts of fluid to escape over a prolonged period. FIG. 4A shows the cartridge cavity closure cap fully secured to the main body 12.

An inspection aperture 162 is defined through the cradle 58 of the cartridge cavity closure cap 14, to assist a user in determining visually whether or not a fluid cartridge is contained within the cartridge cavity 52. Where no cartridge is contained in the cartridge cavity 52, the inspection aperture 162 will be dark, and where a fluid cartridge 50 is contained within the cartridge cavity 52, the bottom or non-outlet end 60 of the fluid cartridge 50 will be visible through the inspection aperture 162. To enhance visibility, the non-outlet end 60 of the fluid cartridge 50 can be painted with a color that contrasts with the color of the outside of the cradle 58 of the cartridge cavity closure cap 14. Because drain blockages are infrequent, the inspection aperture is advantageous, since it allows a user to check whether a cartridge is already loaded in the cartridge cavity 52 before removing the cartridge cavity closure cap 14, since removing the cap would allow a still-charged cartridge to vent to the atmosphere, wasting the remaining fluid therein. When the cartridge cavity closure cap 14 is fully secured to the main body 12, the non-outlet end 60 of the fluid cartridge 50 seats against the correspondingly shaped cradle 50 on the cartridge cavity closure cap 14, effectively sealing the inspection aperture 162.

The cartridge cavity closure cap 14 is constrained, during removal thereof from the main body 12, to move through an intermediate position, as shown in FIG. 4B. In the intermediate position, the fluid cartridge 50 is released from engagement with the cartridge piercer 26 while the cartridge cavity closure cap 14 remains secured to the main body 12, and the cartridge cavity 52 is vented to the ambient atmosphere. As can be seen in FIG. 4B, the cartridge cavity closure cap 14 has been partially unscrewed from the main body 12, and the fluid cartridge 50 has, as a result of expulsion of some of the pressurized fluid contained therein, pushed upward away from the cartridge piercer 26, so that the non-outlet end 60 of the fluid cartridge 50 continues to seat against the correspondingly shaped cradle 50 on the cartridge cavity closure cap 14 and effectively seal the inspection aperture 162.

In the illustrated embodiment, the cartridge insertion aperture 160 is defined by a hollow threaded shaft portion 164, which has a threaded outer surface 166, and the cartridge cavity closure cap has a correspondingly threaded inner surface 168 (best seen in FIG. 4B) for threaded engagement with the threaded shaft portion 164. A vent 170 is defined in the threaded shaft portion 164 in fluid communication with the cartridge cavity 52.

Removal of the cartridge cavity closure cap 14 consists of unscrewing the cartridge cavity closure cap 14 from the threaded shaft portion 164 of the main body 12. As a user unscrews the cartridge cavity closure cap 14, it will reach a partially unscrewed position (i.e. between being fully tightened (FIG. 4A) and being fully unscrewed and removed from the threaded shaft portion 164 (not shown)). In the partially unscrewed position, the cartridge cavity closure cap 14 has been unscrewed past the vent 170 while remaining threadedly secured to the threaded shaft portion 164 of the main body 12. Because the vent 170 has been exposed to the ambient atmosphere, pressurized fluid can escape from the fluid cartridge 50 into the cartridge cavity 52 and then into the atmosphere via the vent 170, while the fluid cartridge 50 remains safely trapped in the cartridge cavity 52 by the cartridge cavity end cap 14. In the absence of the vent 170, if a user were to unscrew the cartridge cavity end cap 14 while the cartridge cavity 52 still contained a fluid cartridge 50 with a significant volume of pressurized fluid, the fluid cartridge 50 could be violently propelled out of the cartridge cavity 52 at the moment the cartridge cavity end cap 14 was completely unscrewed, posing a serious risk to life and safety. In the process, the fluid cartridge 50 might also impart a substantial velocity to the cartridge cavity end cap 14, creating further danger. Inclusion of the vent 170 substantially obviates this risk.

The above described system for venting a cartridge cavity prior to complete removal of the cartridge cavity closure cap is not limited to drain clearing devices, but may be incorporated into any cartridge-based device for controlled release of pressurized fluid having a similar construction. Generally speaking, devices where the above-described venting system is useful will include a main body defining a cartridge cavity and a cartridge insertion aperture at one end thereof, a cartridge piercer disposed at an opposite end of the cartridge cavity from the cartridge insertion aperture, an outlet, a valve mechanism including an inlet connectable in fluid communication with a cartridge received in the cartridge cavity and connected in fluid communication with the outlet for selectively permitting gas from the cartridge to be expelled from the outlet, and a cartridge cavity closure cap removably securable to the main body to obstruct the cartridge insertion aperture and push an outlet end of the fluid cartridge into engagement with the cartridge piercer and close the cartridge cavity. When the aforementioned venting system is incorporated into such a device, the cartridge cavity closure cap of the device will be constrained, during removal thereof from the main body, to move through an intermediate position in which the fluid cartridge is released from engagement with the cartridge piercer while the cartridge cavity closure cap remains secured to the main body and the cartridge cavity is vented to the ambient environment.

Components of a drain clearing device according to aspects of the present invention may be made from suitable types of metal or plastic. Fluid cartridges 50 are preferably made from metal. Components such as the cartridge receiving member 22, fluid chamber member 28, guide collar 36 and driver receiver member 42 may be made from plastic and designed to snap-fit together, or may be maintained in their respective positions within the main body 12 by shoulders within the main body 12 and on the outlet end cap 46 corresponding to respective shoulders on the cartridge receiving member 22 and the driver receiver member 42. For example, with reference to FIG. 3, in the illustrated embodiment the cartridge receiving member 22 has inner and outer annular shoulders 180, 182, respectively, which engage corresponding inner and outer annular shoulders 186, 184 on the main body 12, and the outlet end cap 46 similarly has an annular shoulder 188 which mates with an annular shoulder 190 on the driver receiver member 42. The main body 12 may be formed from two plastic halves, which may be ultrasonically welded together. The plunger actuator 38 is preferably made from a material having sufficient mass, given its size, so that when the valve mechanism 80 is oriented with the plunger actuator 38 above the driver 40, the plunger actuator 38 will consistently fall into engagement with the driving end 40A of the driver 40 as described above. As such, suitable metals are preferred as the material for the plunger actuator 38. Suitably durable metal is also preferred as the material for the cartridge piercer 26.

It will be appreciated that valve mechanisms according to aspects of the present invention, such as exemplary valve mechanism 80, are not limited to use in drain clearing devices, and may be used in other devices where such mechanical fluid metering would be advantageous.

Moreover, while embodiments of a drain clearing device according to an aspect of the present invention have been described as receiving removable and replaceable fluid cartridges, it is within the contemplation of the inventor that alternate embodiments may comprise a disposable unit with an integral, pre-filled fluid reservoir.

Furthermore, while the exemplary plunger 32 and driver 40 have been shown as having generally cylindrical features, the exemplary plunger 32, plunger actuator 38 and driver 40 have been shown as being generally symmetrical (other than the driving end 40A of the driver 40), other suitable shapes, both symmetrical and asymmetrical, may also be used so long as they do not inhibit the function of the mechanism. For example, and without limitation, the shaft of the driver may have a triangular, rectangular or hexagonal perimeter, and parts of the plunger may be similarly configured. In respect of the plunger, sharp corners should be avoided on portions of the exterior surface that will engage the fluid chamber seal, as such corners typically adversely affect sealing.

In addition, while the plunger 32, plunger actuator 38 and driver 40 have been shown with individual respective fluid passages 92, 104 and 112, one or more of these components may, with suitable modifications, be provided with more than one fluid passage.

One or more currently preferred embodiments have been described by way of example. It will be apparent to persons skilled in the art that a number of variations and modifications can be made without departing from the scope of the invention as defined in the claims.

The table below sets out a listing of the reference numerals used herein, as well as the part or feature identified by that reference numeral, for ease of reference. No limitation is implied by this table.

| Reference | Part/Feature Description |
|---|---|
| 10 | Drain clearing device (overall) |
| 12 | Main body of drain clearing device |
| 14 | Cartridge cavity closure cap |
| 16 | Outlet fitting |
| 16A | Inlet end of outlet fitting |
| 16B | Outlet end of outlet fitting |
| 18 | Reservoir end of drain clearing device |
| 20 | Outlet end of drain clearing device |
| 22 | Cartridge receiving member |
| 22A | Inlet end of cartridge receiving member |
| 24 | Cartridge seal |
| 26 | Cartridge piercer |
| 28 | Fluid chamber member 28 |
| 28A | Inlet end of fluid chamber member |
| 28B | Outlet end of fluid chamber member |
| 30 | Plunger biasing member |
| 32 | Plunger |
| 32A | Closed end of plunger |
| 32B | Plunger outlet end |
| 34 | Fluid chamber seal 34 |
| 36 | Guide collar |
| 38 | Plunger actuator |
| 38A | Plunger actuator inlet end |
| 38B | Plunger actuator outlet end |
| 40 | Driver |
| 40A | Driving end of driver |
| 40B | Driver outlet end |
| 42 | Driver receiver member |
| 44 | Grommet |
| 46 | Outlet end cap |
| 48 | End piece for outlet fitting |
| 50 | Fluid cartridge |
| 50A | First exemplary fluid cartridge |
| 50B | Second exemplary fluid cartridge |
| 50C | Third exemplary fluid cartridge |
| 52 | Cavity in main body |
| 54 | Generally cylindrical metal canister |
| 56 | Thin metal seal on generally cylindrical metal canister |
| 58 | Cradle in cartridge cavity closure cap |
| 60 | Non-outlet end of fluid cartridge |

-continued

| Reference | Part/Feature Description |
|---|---|
| 62 | Piercer cannula |
| 80 | Valve mechanism generally |
| 82 | Fluid chamber |
| 84 | Fluid chamber inlet/passageway in cartridge piercer |
| 86 | Receiving collar at inlet end of cartridge receiving member |
| 88 | Plunger aperture in fluid chamber |
| 90 | Opening at outlet end of fluid chamber member |
| 92 | Plunger fluid passage |
| 94 | Peripheral rim surrounding plunger fluid passage |
| 96 | Plunger inlets |
| 98 | Longitudinal wall of plunger |
| 100 | Annular stop on plunger |
| 102 | Interior space defined within guide collar and driver receiver member |
| 104 | Plunger actuator fluid passage |
| 106 | Annular flange at plunger actuator outlet end |
| 108 | Outer surface of plunger actuator |
| 110 | Central aperture in driver receiver member |
| 112 | Driver fluid passage |
| 114 | Driver engagement face |
| 116 | Plunger actuator engagement face |
| 118 | Shaft of driver |
| 120 | Guide channel |
| 122 | Plunger bore in guide collar |
| 124 | Inwardly projecting ribs on outlet fitting |
| 126 | Cylindrical recess in outlet end of outlet fitting |
| 128 | Outer cylindrical wall on end piece |
| 130 | Sector-shaped spokes defined in floor of cylindrical recess in outlet fitting |
| 132 | Inner cylindrical mounting wall on outlet fitting |
| 134 | Outer cylindrical mounting wall on outlet fitting |
| 136 | Annular mounting recess between inner and outer cylindrical mounting walls |
| 138 | Cylindrical mounting end of grommet |
| 140 | Annular driver engagement shoulder defined in inner surface of inner cylindrical mounting wall on outlet fitting |
| 142 | inner surface of inner cylindrical mounting wall on outlet fitting |
| 144 | Outlet fitting fluid passage |
| 146 | First cylindrical fluid passage in end piece |
| 148 | Second cylindrical fluid passage in end piece |
| 150 | Overall outlet aperture |
| 152 | Exemplary drain |
| 160 | Cartridge insertion aperture in main body |
| 162 | Inspection aperture |
| 164 | Hollow threaded shaft portion defining cartridge insertion aperture |
| 166 | Threaded outer surface of threaded shaft portion |
| 168 | Threaded inner surface of cartridge cavity closure cap |
| 170 | Vent defined in threaded shaft portion |
| 180 | Inner annular shoulder on cartridge receiving member |
| 182 | Outer annular shoulder on cartridge receiving member |
| 184 | Outer annular shoulder on main body |
| 186 | Inner annular shoulder on main body |
| 188 | Annular shoulder on outlet end cap |
| 190 | Annular shoulder on driver receiver member |

What is claimed is:

1. A valve mechanism for controlling release of pressurized fluid, comprising:

a housing;

a fluid chamber defined within the housing, the fluid chamber having a fluid chamber inlet and having a plunger aperture and defining an interior volume;

a plunger having a closed end and a plunger outlet end, the plunger having at least one plunger fluid passage extending partially along a length of the plunger from the plunger outlet end, the plunger having at least one plunger inlet defined in a longitudinal wall thereof in fluid communication with the at least one plunger fluid passage;

the plunger being slidably received in the plunger aperture in sealing engagement therewith with the closed end within the interior volume of the fluid chamber so as to be movable between a fluid retention position in which the at least one plunger inlet is isolated from the interior volume of the fluid chamber and a fluid release position in which the at least one plunger inlet is in fluid communication with the interior volume of the fluid chamber;

a plunger biasing member acting between the plunger and the housing to bias the plunger into the fluid retention position;

a driver having a driving end and a driver outlet end and having at least one driver fluid passage extending therethrough between the driving end and the driver outlet end, the driver being slidably received within the housing;

a plunger actuator having a plunger actuator inlet end and a plunger actuator outlet end, the plunger actuator having at least one plunger actuator fluid passage extending therethrough between the plunger actuator inlet end and the plunger actuator outlet end, the plunger actuator received within the housing between the plunger and the driver; and a guide mechanism for:

guiding the plunger actuator into engagement with the plunger to cause the plunger and the plunger actuator to move in unison and move the plunger into the fluid release position during a first portion of a stroke of the driver towards the fluid chamber when the valve mechanism is oriented with the plunger actuator above the driver; and further guiding the plunger actuator to permit the plunger to return to the fluid retention position under urging from the plunger biasing member during a second portion of the stroke of the driver towards the fluid chamber when the valve mechanism is oriented with the plunger actuator above the driver;

wherein at least when the plunger is in the fluid release position, the at least one plunger fluid passage is in fluid communication with the at least one plunger actuator fluid passage and the at least one plunger actuator fluid passage is in fluid communication with the at least one driver fluid passage;

wherein following completion of the stroke of the driver towards the fluid chamber and release of external force acting on the driver, the plunger actuator and the driver return to their respective pre-stroke positions under gravity when the valve mechanism is oriented with the plunger actuator above the driver;

wherein the at least one plunger fluid passage comprises a single plunger fluid passage and the plunger actuator inlet end is sized to fit within the single plunger fluid passage, and wherein:

the plunger has a peripheral rim surrounding the single plunger fluid passage at the plunger outlet end;

the plunger actuator inlet end of the plunger actuator engages the peripheral rim at the plunger outlet end during the first portion of the stroke of the driver towards the fluid chamber when the valve mechanism is oriented with the plunger actuator above the driver; and the plunger actuator inlet end moves into registration with the single plunger fluid passage so that the plunger actuator inlet end is received within the single plunger fluid passage to permit sliding movement of the plunger toward the plunger actuator during the second portion of the stroke of the driver towards the fluid chamber when the valve mechanism is oriented with the plunger actuator above the driver.

2. The valve mechanism of claim 1, wherein the guide mechanism comprises the driving end of the driver having a driver engagement face and the plunger actuator outlet end having a plunger actuator engagement face and at least one of the driver engagement face and the plunger actuator engagement face is shaped to direct the plunger actuator inlet end of the plunger actuator to engage the peripheral rim at the plunger outlet end during the first portion of the stroke of the driver towards the fluid chamber when the valve mechanism is oriented with the plunger actuator above the driver.

3. The valve mechanism of claim 2, wherein the guide mechanism further comprises a guide channel defined in the housing, the guide channel being so positioned within the housing and having a surface shaped to guide the plunger actuator inlet end into registration with the single plunger fluid passage during the second portion of the stroke of the driver towards the fluid chamber when the valve mechanism is oriented with the plunger actuator above the driver.

4. The valve mechanism of claim 3, wherein the plunger actuator inlet end is narrower than the plunger actuator outlet end and wherein the guide channel has a narrow end adjacent the plunger and a wide end adjacent the driver and tapers between the wide end and the narrow end.

* * * * *